United States Patent
Subramanian et al.

(10) Patent No.: US 12,112,344 B2
(45) Date of Patent: Oct. 8, 2024

(54) TECHNIQUES FOR PREVENTING SHRINK BASED ON HYBRID MACHINE LEARNING SYSTEM

(71) Applicant: Sensormatic Electronics, LLC, Boca Raton, FL (US)

(72) Inventors: Gopi Subramanian, Delray Beach, FL (US); Michael C. Stewart, Delray Beach, FL (US); Harish Yadav, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 116 days.

(21) Appl. No.: 17/236,604

(22) Filed: Apr. 21, 2021

(65) Prior Publication Data
US 2022/0343349 A1    Oct. 27, 2022

(51) Int. Cl.
*G06Q 30/0202*    (2023.01)
*G06N 5/04*    (2023.01)
*G06N 20/00*    (2019.01)

(52) U.S. Cl.
CPC .......... *G06Q 30/0202* (2013.01); *G06N 5/04* (2013.01); *G06N 20/00* (2019.01)

(58) Field of Classification Search
CPC ......... G06Q 30/00202; G06Q 30/0202; G06N 5/04; G06N 20/00
See application file for complete search history.

(56) References Cited

U.S. PATENT DOCUMENTS

| | | | |
|---|---|---|---|
| 11,003,568 B2* | 5/2021 | Smith | G06F 11/0793 |
| 11,055,730 B2* | 7/2021 | Blomberg | G06Q 30/0202 |
| 11,461,690 B2 | 10/2022 | Szeto et al. | |
| 2017/0286839 A1* | 10/2017 | Parker | G06N 5/04 |
| 2019/0027003 A1* | 1/2019 | Lobo | G08B 13/19645 |
| 2019/0188536 A1 | 6/2019 | Lei et al. | |
| 2020/0265437 A1 | 8/2020 | Cash | |
| 2021/0056487 A1* | 2/2021 | Boyle | H04L 43/0823 |
| 2021/0174130 A1 | 6/2021 | Austin | |
| 2022/0012604 A1* | 1/2022 | Mumma | G06Q 20/3227 |
| 2022/0343234 A1* | 10/2022 | Subramanian | G06F 16/258 |
| 2022/0343349 A1* | 10/2022 | Subramanian | G06N 20/00 |
| 2023/0062725 A1* | 3/2023 | Pal | H02J 13/0004 |

* cited by examiner

*Primary Examiner* — Dylan C White
(74) *Attorney, Agent, or Firm* — ArentFox Schiff LLP (57) ABSTRACT

Aspects of the present disclosure provide techniques that utilize artificial intelligence (AI) to preemptively identify and prioritize risks for retailers from shrink loss. Specifically, features of the present disclosure provide actionable prescriptions to prevent shrink based on the output of a hybrid machine learning (ML) system that accurately identifies shrink risk factors and implements a cost-effective shrinkage control plan to reduce the retail theft. The shrinkage control plan may then be displayed to the user on a display device (or user interface) in order to allow for the user (e.g., store manager) to implement the recommendations developed by the recommendation engine.

15 Claims, 4 Drawing Sheets

TECHNIQUES FOR PREVENTING SHRINK BASED ON HYBRID MACHINE LEARNING SYSTEM

BACKGROUND

Retail theft is as old as retail itself. With the growth in retail, retail theft has also experienced tremendous rise in terms of size and complexity. In retail, the term "shrink" or "shrinkage" refers to the difference between book inventory (e.g., inventory of items that the retailer expects should be in retailer's possession for accounting purposes) and actual physical inventory (e.g., the number of items that are actually in retailer's possession). And while shrink losses may be caused by accounting errors, the leading cause of shrinkage is retail theft. Retail theft may occur through concealment, grab and dash, altering or swapping price tags, or when customers attempt to return stolen goods or imitation designer products to receive cash.

Shrinkage is a costly problem for retailers—costing the industry over $60 billion annually. Due to the impact of shrinkage on the retail industry, there is a need to identify how retail loss occurs and how to prevent retail theft.

SUMMARY

Aspects of the present disclosure provide techniques that utilize artificial intelligence (AI) to preemptively identify and prioritize risks for retailers from shrink loss. Specifically, features of the present disclosure provide actionable prescriptions to prevent shrink based on the output of a hybrid machine learning (ML) system that accurately identifies shrink risk factors and implements a cost-effective shrinkage control plan to reduce the retail theft. The shrinkage control plan may then be displayed to the user on a display device (or user interface) in order to allow for the user (e.g., store manager) to implement the recommendations developed by the recommendation engine.

In one example, a method for performing data analytics using machine learning is disclosed. The method may comprise extracting data associated with one or more shrink predictions generated by a hybrid machine learning algorithm, wherein the hybrid machine learning model selects two or more machine learning algorithms from the plurality of machine learning algorithms such that the hybrid machine learning model provides a lower margin of error than the margin of error achieved from any one of the plurality of machine learning algorithms individually. The method may further comprise identifying one or more products that are at an elevated risk for shrink during a forthcoming period of time based in part on the data associated with the one or more shrink predictions provided by the hybrid machine learning algorithm. The method may further comprise generating a shrink control plan that identifies actionable steps to minimize risk for shrinkage for the one or more products identified, wherein the shrink control plan includes actionable steps to implement for securing the one or more products. The method may further comprise displaying the shrink control plan on a display device.

In another example, an apparatus for performing data analytics using machine learning is disclosed. The apparatus may include a memory configured to store instructions and a processor communicatively coupled with the memory. The processor may be configured to execute the instructions to extract data associated with one or more shrink predictions generated by a hybrid machine learning algorithm, wherein the hybrid machine learning model selects two or more machine learning algorithms from the plurality of machine learning algorithms such that the hybrid machine learning model provides a lower margin of error than the margin of error achieved from any one of the plurality of machine learning algorithms individually. The processor may further be configured to execute the instructions to identify one or more products that are at an elevated risk for shrink during a forthcoming period of time based in part on the data associated with the one or more shrink predictions provided by the hybrid machine learning algorithm. The processor may further be configured to execute the instructions to generate a shrink control plan that identifies actionable steps to minimize risk for shrinkage for the one or more products identified, wherein the shrink control plan includes actionable steps to implement for securing the one or more products. The processor may further be configured to execute the instructions to display the shrink control plan on a display device.

In another example, a non-transitory computer readable medium for performing data analytics using machine learning is disclosed. The computer readable medium may include code for extracting data associated with one or more shrink predictions generated by a hybrid machine learning algorithm, wherein the hybrid machine learning model selects two or more machine learning algorithms from the plurality of machine learning algorithms such that the hybrid machine learning model provides a lower margin of error than the margin of error achieved from any one of the plurality of machine learning algorithms individually. The computer readable medium may include code for identifying one or more products that are at an elevated risk for shrink during a forthcoming period of time based in part on the data associated with the one or more shrink predictions provided by the hybrid machine learning algorithm. The computer readable medium may include code for generating a shrink control plan that identifies actionable steps to minimize risk for shrinkage for the one or more products identified, wherein the shrink control plan includes actionable steps to implement for securing the one or more products. The computer readable medium may include code for displaying the shrink control plan on a display device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

As discussed above, one of leading cause of shrinkage is retail theft. Due to the impact of shrinkage, there is a need to identify how retail loss occurs and how to prevent retail theft. One solution to the above-identified problem is leveraging artificial intelligence (AI). To this end, machine learning algorithms may be implemented that are developed based on a single machine learning (ML) algorithm (e.g., random forest or random tree regression). However, no single machine learning algorithm may provide a comprehensive solution for the entire dataset or situation, and therefore may naturally have "blind spots" in its outputs.

In order to address the above shortfalls, aspects of the present disclosure provide techniques that preemptively identify and prioritize risks for retailers from shrink loss by utilizing a hybrid ML system that selects two or more machine learning algorithms to develop a machine learning model to accurately identify shrink risk factors and implement a cost-effective shrinkage control plan to control the retail theft. The shrinkage control plan that may include actionable recommendations to prevent or minimize risk of shrink may then be displayed to the user on a display device (or user interface) in order to allow for the user (e.g., store manager) to implement the recommendations developed by the recommendation engine.

Various aspects are now described in more detail with reference to the FIGS. 1-3. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
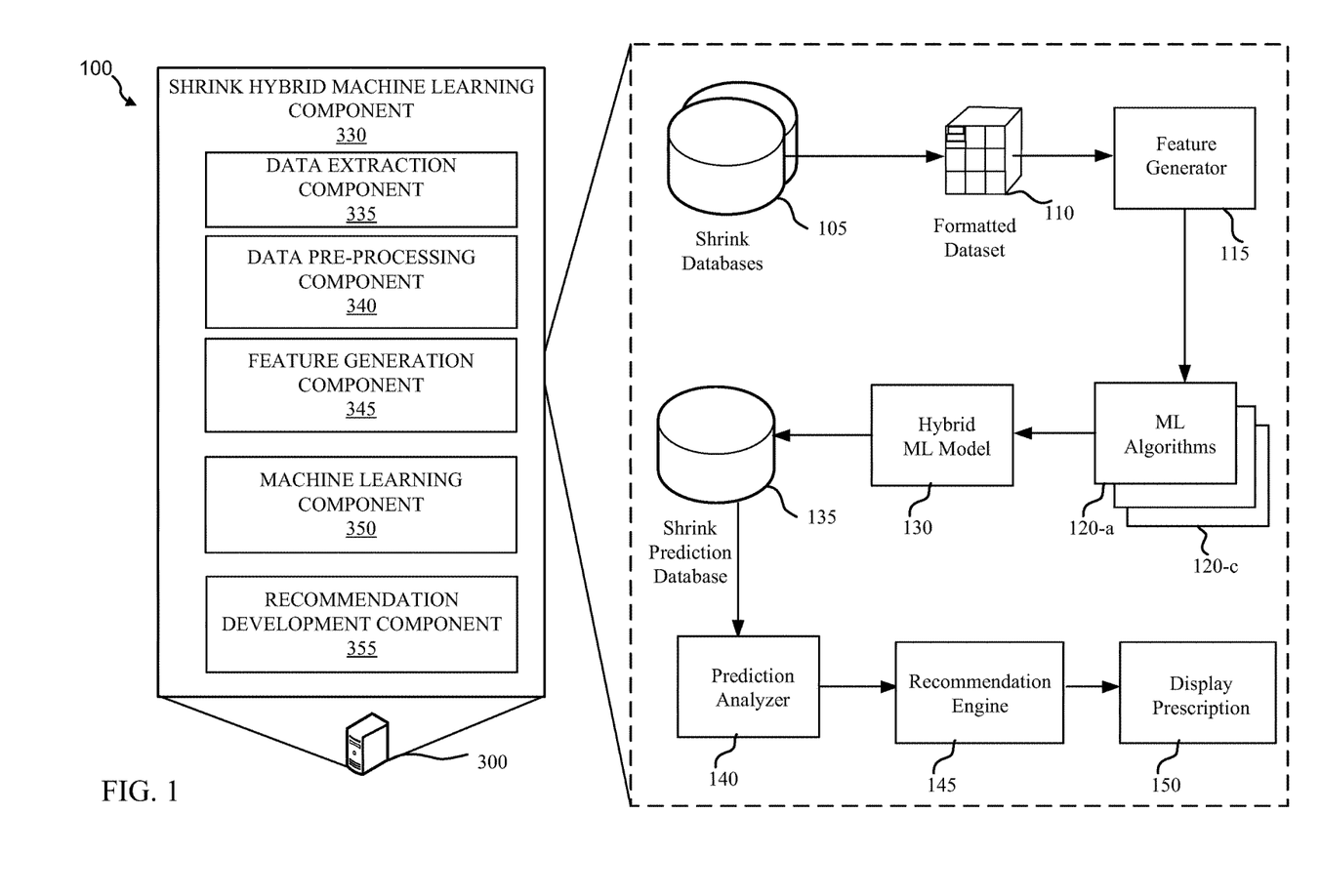
FIG. 1 is a block diagram of a system for generating and presenting real-time interior analytics for shrink using machine learning (ML) in accordance with aspects of the present disclosure.
Figure 3:
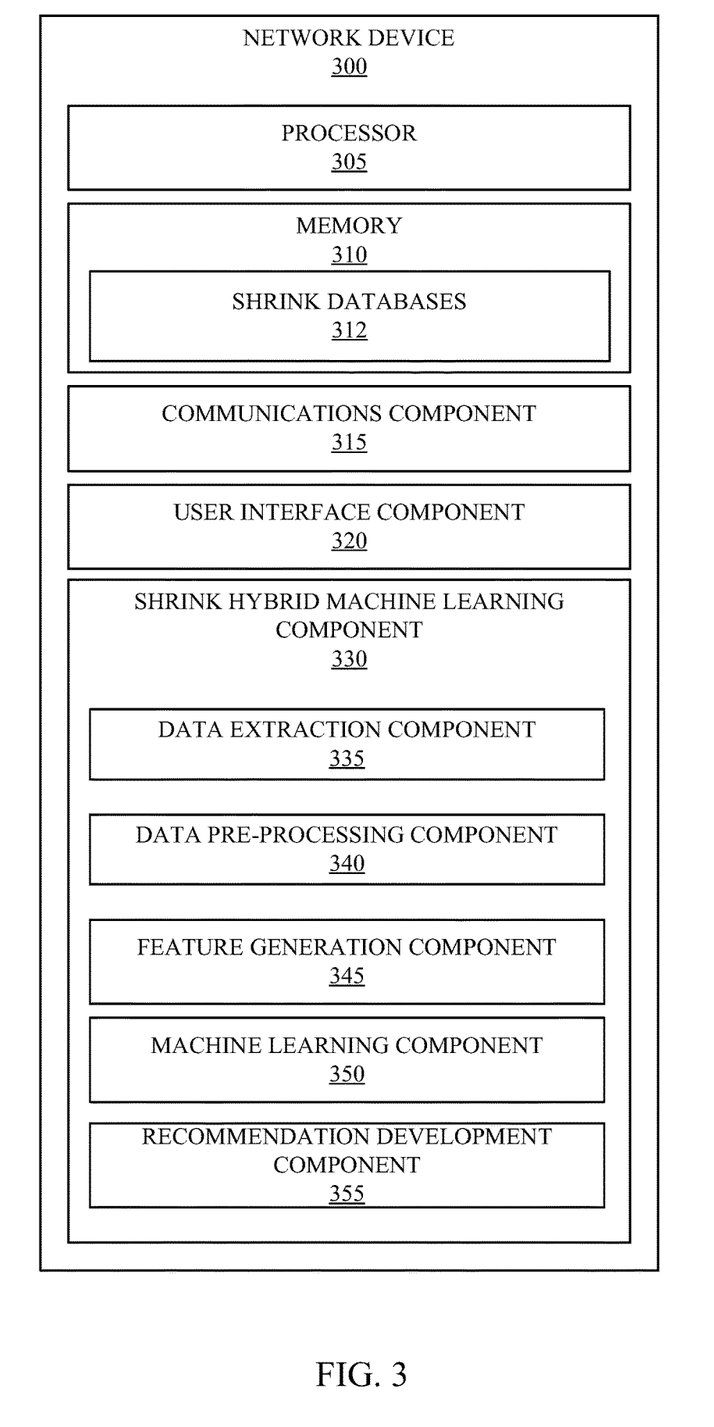
FIG. 3 is diagram illustrating an example of a hardware implementation for the network device in accordance with various aspects of the present disclosure.

FIG. 1 is a block diagram 100 of a system for generating and presenting real-time analytics for shrink using ML that may be implemented by a network device 300 (see FIG. 3). In some aspects, the network device 300 may be an example of a server or a computer device that may have access to real-time data collected and stored in one or more databases (e.g., 105) for one or more retailers or entities. In some aspects, the network device 300 may include a shrink hybrid machine learning component 330 to implement AI and machine learning for mitigating retail theft risks.

The network device 300 and shrink hybrid machine learning component 330 may implement features of the present disclosure by accessing one or more shrink databases 105. The shrink databases 105 may include real-time information for inventory, traffic information that calculates the number of customers that may be present in any one store at any given time, and/or shrink information (e.g., number of items that may be stolen or lost from inventory). In some aspects, the shrink databases 105 may update information in real-time (e.g., updated every second) that reflects inventory of items that are arriving in store and connected to point-of-sale devices that reflect all sales made within the retail store. The shrink databases 105 may also be coupled with electronic article surveillance (EAS) that tracks any items that exits a geofence perimeter without being accounted for at the point-of-sale (e.g., if a customer steals any item). The shrink databases 105 may also include additional information such as weather for any particular day as the weather may impact the traffic flow of customers. For example, an inclement or rainy weather may reduce the number of people that may visit a retail store.

In sum, the shrink databases 105 may include voluminous data from different systems (e.g., inventory, EAS, point-of-sale, weather, etc.) about various aspects that may impact the performance of the retailer for any particular day or time. However, more data in and of itself does not provide more insight. Indeed, in some instances, access to more data may be counterintuitive. Therefore, in order to develop the hybrid machine learning model that may accurately identify the risk factors and prescriptions that impact shrink, the data extraction component 335 may extract relevant data from the shrink databases 105. Further, the data pre-processing component 340 may process the extracted data or dataset and format the data or dataset 110 in such a manner that the data collected from diverse databases are all synthesized and formatted for further processing.

To this end, the data pre-processing component 340 may first summarize the data to increase the level of granularity that is available. For example, while the shrink databases 105 may include data for every second, such detail may not be helpful to identify patterns that impact shrink loss. Therefore, the data pre-processing component 340 may raise the granularity of the collected data by summarizing the second-to-second data to an hourly or daily collection. As such, the volume of data that may be processed is dramatically reduced. In some aspects, the data pre-processing component 340 may also identify field(s) within the dataset that identify the type of item and/or the department the item may belong to in order to track the shrink loss.

Additionally, in many instances, retailers may not be as concerned about low-priority items against shrink loss compared to high-priority items. The level of priority, however, is not always directly proportional to the monetary value of the item. For example, historically the most common targets for retail theft are not jewelry, but rather razors, cosmetics, and over-the-counter medications. Each retailer, therefore, may value items differently. As such the data pre-processing component 340 may utilize a user interface component 320 (see FIG. 3) to select items within the extracted data and allocate different priorities to each item (e.g., low priority, medium priority, and high priority). As such, the data pre-processing component 340 may allocate different weights to each item based on the input from the retailer via the user interface component 340. The formatted dataset may also be subdivided into either training dataset used to train the machine learning algorithm and testing dataset in order to verify the accuracy of the ML model against historical data.

Once the dataset has been formatted and normalized across the plurality of databases, the formatted dataset 110 may be fed into the feature generator 115. In some examples, the feature generator 115 in collaboration with the feature generation component 345 may generate or identify attributes within the training dataset of the formatted data that are associated with retail theft. For example, the feature generation component 345 may identify patterns and trends of how day of the week (e.g., weekend, weekday, holidays, etc.) and/or weather (e.g., rain, snow, etc.) impact retail theft of specific items. Other features may include counting items that were subject to retail theft on same day of the week, same hour, and items located within specified zones (e.g., different areas of the department store that are zoned for category of items. Other features that may be generated include, but are not limited to, item shrink frequency ratio during the week across all zones for weekdays and hours or number of times an item shrank on holidays across all days, hours, weeks, and zones. Additionally or alternatively, the feature generation component 345 may identify total number of items that were subject to "grab and run" in particular zones, days, and hours.

Based on the generated feature that are captured from the formatted dataset, the feature generation component 345 may begin to identify trends and patterns for any particular store and/or retailer. The generated features may then be input into a plurality of machine learning algorithms 120 (e.g., linear regression, logistic regression, decision tree, random forest, dimensionality reduction algorithms, or gradient boosting algorithms, etc.). It should be appreciated that the type of machine learning algorithms identified here are just examples and any ML algorithm may be implemented.

Once the machine learning algorithm is trained based on the training dataset, each of the plurality of ML algorithms 120 may be tested against the testing dataset. Specifically, the ML algorithms 120 may output predictions of risk factors and likelihood of an item being subject to retail theft for any particular day or time. In some aspects, the predictions may identify the items that are at risk for theft, the number of items that is expected to be shrunk on one or more of the upcoming days or weeks. The outputs of each of the plurality of ML algorithms 120 may be measured against known testing dataset (e.g., historical data that was set aside from the training dataset). The margin of error for each of the plurality of ML algorithms 120 outputs against the testing dataset may be measured as a mean absolute error, root mean square error, or broadly the difference between the predictions against actual shrink for any particular day.

However, the lowest margin of error for any one of the plurality of ML algorithms 120 while attractive, might be further improved by the features of the present disclosure. Indeed, the machine learning component 350 may then test a plurality of combinations of machine learning algorithms taken together (e.g., applying random forest algorithm followed by random tree regression algorithm) or modifying any one machine learning algorithm (e.g., random forest algorithm that is then subject to dimensionality reduction) in order to provide a more accurate prediction of likelihood of shrink. Thus, the machine learning component 350 may test combinations of two or more machine learning algorithms and a particular order in which the different algorithms may be applied in order to select two or more machine learning algorithms from the plurality of machine learning algorithms to form a hybrid machine learning model 130. In some aspects, the hybrid machine learning model 130 may provide a lower margin of error than the margin of error achieved from any one of the plurality of machine learning algorithms individually.

In some aspects, the output of the hybrid machine learning model may identify the items that are at risk for theft, the number of items that may be expected to be shrunk on one or more of the upcoming days or weeks. For example, the hybrid machine learning model 130 may determine that, based on patterns from historical data that indicate an uptick in retail theft on weekend preceding a holiday (e.g., Saturday or Sunday) when the weather is sunny and there is expected high traffic in the store, there is high likelihood that particular item or items (or "products") that may be stolen. The hybrid machine learning model 130 may also identify the total number of items that are expected to be shrunk in specific zones (e.g., areas within the store based on location of the exit doors).

While the hybrid machine learning model 130 may take into consideration a host of criteria, including but not limited to days, time of the day that experiences an elevated shrinkage, traffic within the store, weather, and other contributing factors, the output of hybrid machine learning model 130 may provide output that by itself may not be actionable on by the user. In other words, simply identifying that, for example, Thursday of next week at 6:00 pm there is high probability of shrinkage for cosmetics given historical information while Friday of the same week, the store may expect to have laptops shrunk may not be enough for a user to allocate resources effectively. This is because the hybrid machine learning model 130 may provide predictions for every day and hour for next two to three weeks. Therefore, it is impractical for the user (e.g., store manager) to take the influx of this information and determine what is the best allocation of resources (e.g., moving security or moving the products to different location etc.).

Accordingly, the prediction analyzer 140 may extract the array of predictions provided by the hybrid machine learning model 130 and organize the information to be fed into a recommendation engine 145. In turn, the recommendation engine 145, in collaboration with the recommendation development component 355 of the network device 300, may generate actionable recommendations that maximize the use of available resources. For example, the recommendation engine 145 may provide instructions to move the display of certain items away from exit doors as they may be susceptible to retail theft in coming days and/or or place security in the high risk zones. The recommendation engine 145 may also generate information about securing certain zones or products with EAS or directing one or more cameras to be adjusted based on the risk factors. The recommendation engine 145 output is important because the items that may be at risk for shrink are not always constant year around or even day-to-day or hour-to-hour. For example, while razors may be at a greater risk for shrink in the beginning of week in the mornings, laptops may be at an elevated risk in the evenings of the same day. In other instances, cosmetics may be at an elevated risk during different times. As such, for the user to be able to generate an actionable plan that accounts for the dynamic changes in shrink risk would be impractical. To this end, the output of the recommendation engine 145 that is based on anticipated shrink for upcoming days and weeks from the hybrid machine learning model 130 assists in developing a shrink control plan that may be displayed 150 to the user for implementation. The output of the recommendation engine 145 may also be stored, in the memory of the network device 300.

Figure 2A:
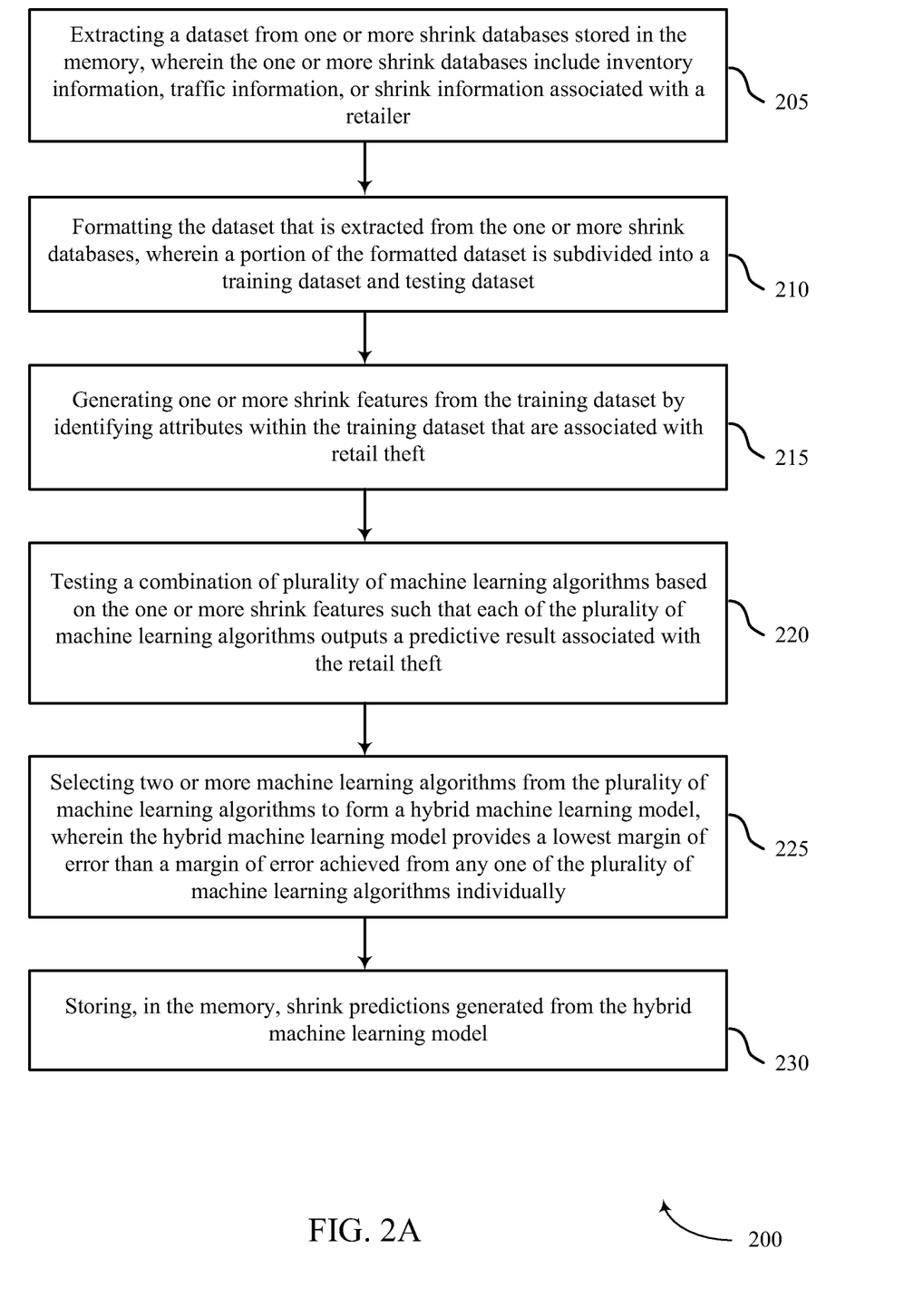
FIG. 2A is an example flowchart for performing data analytics using machine learning in accordance with aspects of the present disclosure.

FIG. 2A is flowchart 200 for performing data analytics using machine learning in accordance with aspects of the present disclosure. Aspects of flowchart 200 may be performed by the network device 300 as described with reference to FIG. 3.

At block 205, the method 200 may include extracting a dataset from one or more shrink databases 312 (see FIG. 3) stored in the memory 310, wherein the one or more shrink databases 312 include at least one of inventory information, traffic information, and/or shrink information associated with a retailer. Aspects of block 205 may be performed by the network device 300 in combination with shrink hybrid machine learning component 330, and more particularly data extraction component 335 described with reference to FIG. 3.

At block 210, the method 200 may include formatting the dataset that is extracted from the one or more shrink databases, wherein a portion of the formatted dataset is subdivided into a training dataset and testing dataset. In some examples, formatting the dataset that is extracted from the one or more shrink databases may further comprise processing the dataset in order to expand granularity of information associated with the inventory information, the traffic information, or the shrink information for the retailer included in the one or more databases. The method may further include identifying data points within the dataset that identify one or more of types of items that the retailer has identified as high priority items and allocating weights to each of the one or more types of items based on input from the retailer. Aspects of block 210 may be performed by the shrink hybrid machine learning component 330, and more particularly data pre-processing component 340 described with reference to FIG. 3.

At block 215, the method 200 may include generating one or more shrink features from the training dataset by identifying attributes within the training dataset that are associated with retail theft. In some aspects, generating the one or more shrink features may include determining a pattern during a time period that directly correlates against increase in the retail theft for the time period. Aspects of block 215 may be performed by shrink hybrid machine learning component 330, and more particularly feature generation component 345 described with reference to FIG. 3.

At block 220, the method 200 may include testing a combination of plurality of machine learning algorithms based on the one or more shrink features such that at least a subset of the plurality of machine learning algorithms outputs a predictive result associated with the retail theft. In some aspects, testing the combination of the plurality of machine learning algorithms may include determining the margin of error that is achieved from the plurality of machine learning algorithms against the testing dataset that reflects the actual shrink for a time period, wherein the margin of error includes one or both of the mean absolute error or root mean square error for the time period. The plurality of machine learning algorithms includes at least one or more of linear regression, logistic regression, decision tree, random forest, dimensionality reduction algorithms, or gradient boosting algorithms. Aspects of block 220 may be performed by shrink hybrid machine learning component 330, and more particularly machine learning component 350 described with reference to FIG. 3.

At block 225, the method 200 may include selecting two or more machine learning algorithms from the plurality of machine learning algorithms to form a hybrid machine learning model, wherein the hybrid machine learning model provides a lowest margin of error than a margin of error achieved from any one of the plurality of machine learning algorithms individually. In some examples, selecting two or more machine learning algorithms to form the hybrid machine learning model may include modifying or tuning at least one of the two or more machine learning algorithms that are selected for the hybrid machine learning model (e.g., modifying the random forest algorithm by further applying dimensionality reduction to the random forest algorithm). Aspects of block 225 may be performed by shrink hybrid machine learning component 330, and more particularly machine learning component 350 described with reference to FIG. 3.

At block 230, the method 200 may include storing, in the memory, shrink predictions generated from the hybrid machine learning model. Aspects of block 230 may be performed by shrink hybrid machine learning component 330 storing the shrink predictions in the memory 310 described with reference to FIG. 3. The method 200 may also include displaying the shrink predictions output generated from the hybrid machine learning model on a display device.

Figure 2B:
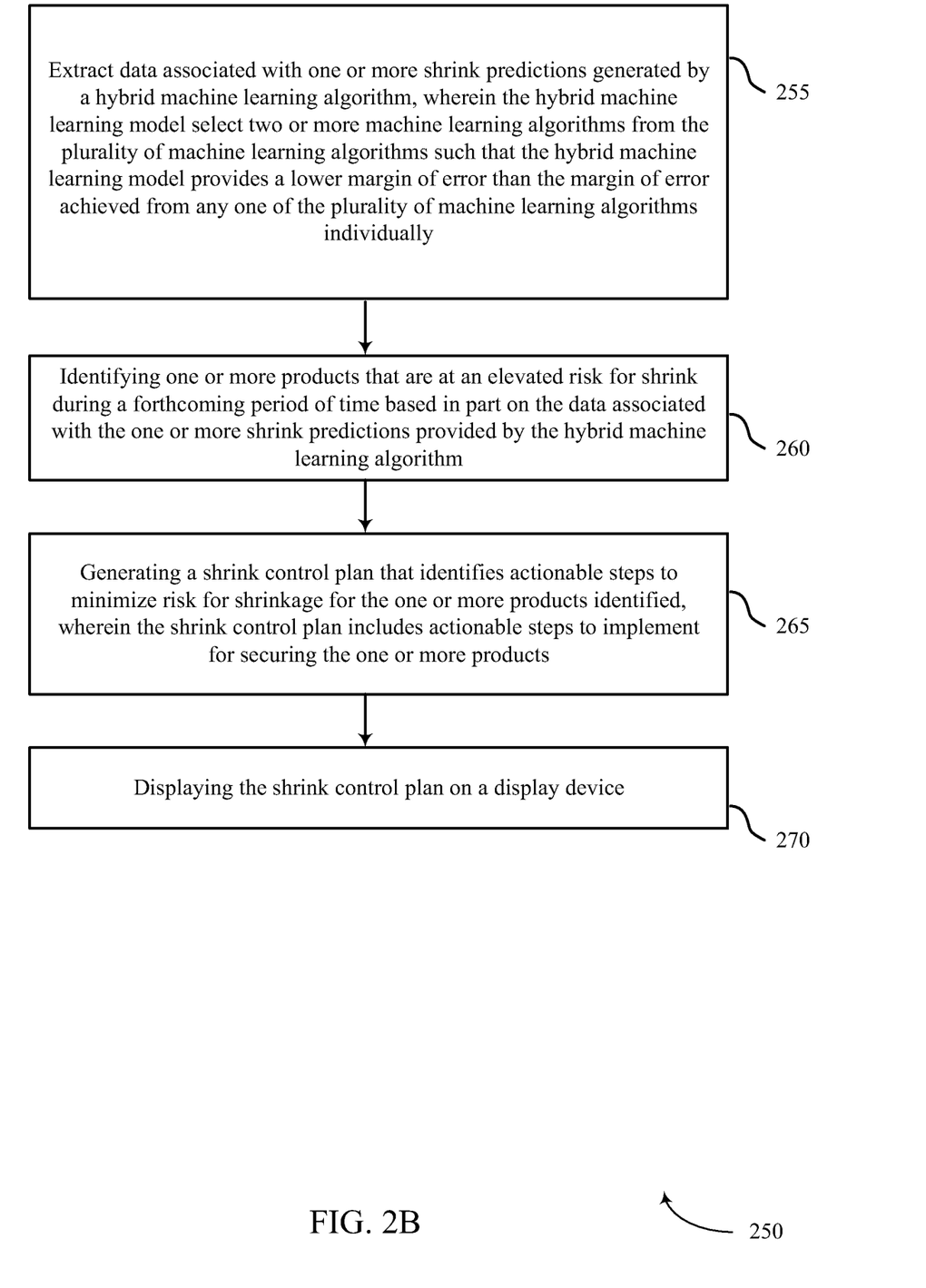
FIG. 2B is an example flowchart for generating an actionable shrink control plan based on the output of the hybrid machine learning model in accordance with aspects of the present disclosure.

FIG. 2B is flowchart 250 for generating an actionable shrink control plan based on the output of the hybrid machine learning model in accordance with aspects of the present disclosure. Aspects of flowchart 200 may be performed by the network device 300 as described with reference to FIG. 3.

At block 255, the method 250 may include extracting data associated with one or more shrink predictions generated by a hybrid machine learning algorithm, wherein the hybrid machine learning model selects two or more machine learning algorithms from the plurality of machine learning algorithms such that the hybrid machine learning model provides a lower margin of error than the margin of error achieved from any one of the plurality of machine learning algorithms individually. In some aspects, the hybrid machine learning algorithm may select two or more algorithms from a subset of machine learning algorithms, wherein the subset of machine learning algorithms includes at least one or more of linear regression, logistic regression, decision tree, random forest, dimensionality reduction algorithms, or gradient boosting algorithms. In some examples, the data associated with one or more shrink predictions generated by the hybrid machine learning algorithm may identify the one or more products and an amount of shrinkage for the one or more products that is expected in the forthcoming period of time. Aspects of block 255 may be performed by the shrink hybrid machine learning component 330, and more particularly the data extraction component 335 described with reference to FIG. 3.

At block 260, the method 250 may include identifying one or more products that are at an elevated risk for shrink during a forthcoming period of time based in part on the data associated with the one or more shrink predictions provided by the hybrid machine learning algorithm. Aspects of block 260 may be performed by the recommendation development component 355 described with reference to FIG. 3.

At block 265, the method 250 may include generating a shrink control plan that identifies actionable steps to minimize risk for shrinkage for the one or more products identified, wherein the shrink control plan includes actionable steps to implement for securing the one or more products. In some examples, the shrink control plan may include information regarding allocation of resources that a user may implement to minimize risk of shrinkage for the one or more products, including but not limited to relocating the high risk items to different part of the store. The resources may also be one or both of human resources or electronic article surveillance (EAS) that are deployed in order to prevent or minimize the risk of shrinkage for the one or more products. Aspects of block 265 may also be performed by the recommendation development component 355 described with reference to FIG. 3.

At block 270, the method 250 may include displaying the shrink control plan on a display device. Aspects of block 270 may be performed by the user interface component 320 described with reference to FIG. 3.

Referring now to FIG. 3, a diagram illustrating an example of a hardware implementation for the network device 300 in accordance with various aspects of the present disclosure is described.

The network device 300 may include a processor 305 for carrying out one or more processing functions (e.g., methods 200 and 250) described herein. The processor 305 may include a single or multiple set of processors or multi-core processors. Moreover, the processor 305 can be implemented as an integrated processing system and/or a distributed processing system.

The network device 300 may further include a memory 310, such as for storing local versions of applications being executed by the processor 305. In some aspects, the memory 310 may be implemented as a single memory or partitioned memory. In some examples, the operations of the memory 310 may be managed by the processor 305. Memory 310 can include a type of memory usable by a computer, such as random access memory (RAM), read only memory (ROM), tapes, magnetic discs, optical discs, volatile memory, non-volatile memory, and any combination thereof. Additionally, the processor 305, and memory 310, may include and execute operating system (not shown).

Further, the network device 300 may include a communications component 315 that provides for establishing and maintaining communications with one or more parties utilizing hardware, software, and services as described herein. Communications component 315 may carry communications between components of the network device 300. The communications component 315 may also facilitate communications with external devices to the network device 300, such as to electronic devices coupled locally to the network device 300 and/or located across a communications network and/or devices serially or locally connected to the network device 300. For example, communications component 315 may include one or more buses operable for interfacing with external devices.

The network device 300 may include a user interface component 320 operable to receive inputs from a user of the network device 300 and further operable to generate outputs for presentation to the user. The user interface component 320 may include one or more input devices, including but not limited to a navigation key, a function key, a microphone, a voice recognition component, any other mechanism capable of receiving an input from a user, or any combination thereof. Further, user interface component 320 may include one or more output devices, including but not limited to a display, a speaker, any other mechanism capable of presenting an output to a user, or any combination thereof.

The network device 300 may further include an shrink hybrid machine learning component 330 for performing data analytics using machine learning in accordance with aspects of the present disclosure. The shrink hybrid machine learning component 330 may further include a data extraction component 335, data pre-processing component 340, feature generation component 345, machine learning component 350, and recommendation development component 355 to perform one or more steps described herein.

As used in this application, the terms "component" and "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for performing data analytics using machine learning, the apparatus comprising:
    a memory configured to store instructions; and
    a processor communicatively coupled with the memory, the processor configured to execute the instructions to:
        train a plurality of machine learning algorithms using a training dataset;
        extract data associated with one or more shrink predictions generated by a hybrid machine learning algorithm, wherein a hybrid machine learning model selects and tests a plurality of combinations of learning algorithms from the plurality of machine learning algorithms by feeding outputs of a first machine learning algorithm as inputs to a second machine learning algorithm in a particular order and selecting two or more machine learning algorithms from the plurality of machine learning algorithms and a particular order such that the hybrid machine learning model provides a lower margin of error than the margin of error achieved from any one of the plurality of machine learning algorithms individually;
        identify one or more products that are at an elevated risk for shrink during a forthcoming period of time based in part on the data associated with the one or more shrink predictions provided by the hybrid machine learning algorithm;
        generate a shrink control plan that identifies actionable steps to minimize risk for shrinkage for the one or more products identified, wherein the shrink control plan includes actionable steps to implement for securing the one or more products; and
        display the shrink control plan on a display device.

2. The apparatus of claim 1, wherein the data associated with one or more shrink predictions generated by the hybrid machine learning algorithm identifies the one or more products and an amount of shrinkage for the one or more products that is expected in the forthcoming period of time.

3. The apparatus of claim 1, wherein the shrink control plan includes information regarding allocation of resources that a user may implement to minimize risk of shrinkage for the one or more products.

4. The apparatus of claim 3, wherein the resources are one or more of human resources, relocation of items to different zones or areas of a retail store, electronic article surveillance (EAS) that are deployed in order to prevent or minimize the risk of shrinkage for the one or more products.

5. The apparatus of claim 1, wherein the hybrid machine learning algorithm selects two or more algorithms from a subset of machine learning algorithms, wherein the subset of machine learning algorithms includes at least one or more of linear regression, logistic regression, decision tree, random forest, dimensionality reduction algorithms, or gradient boosting algorithms.

6. A method for performing data analytics using machine learning comprising:
training a plurality of machine learning algorithms using a training dataset;
extracting data associated with one or more shrink predictions generated by a hybrid machine learning algorithm, wherein a hybrid machine learning model selects and tests a plurality of combinations of learning algorithms from the plurality of machine learning algorithms by feeding outputs of a first machine learning algorithm as inputs to a second machine learning algorithm in a particular order and selecting two or more machine learning algorithms from the plurality of machine learning algorithms and a particular order such that the hybrid machine learning model provides a lower margin of error than the margin of error achieved from any one of the plurality of machine learning algorithms individually;
identifying one or more products that are at an elevated risk for shrink during a forthcoming period of time based in part on the data associated with the one or more shrink predictions provided by the hybrid machine learning algorithm;
generating a shrink control plan that identifies actionable steps to minimize risk for shrinkage for the one or more products identified, wherein the shrink control plan includes actionable steps to implement for securing the one or more products; and
displaying the shrink control plan on a display device.

7. The method of claim 6, wherein the data associated with one or more shrink predictions generated by the hybrid machine learning algorithm identifies the one or more products and an amount of shrinkage for the one or more products that is expected in the forthcoming period of time.

8. The method of claim 6, wherein the shrink control plan includes information regarding allocation of resources that a user may implement to minimize risk of shrinkage for the one or more products.

9. The method of claim 8, wherein the resources are one or more of human resources, relocation of items to different zones or areas of a retail store, electronic article surveillance (EAS) that are deployed in order to prevent or minimize the risk of shrinkage for the one or more products.

10. The method of claim 6, wherein the hybrid machine learning algorithm selects two or more algorithms from a subset of machine learning algorithms, wherein the subset of machine learning algorithms includes at least one or more of linear regression, logistic regression, decision tree, random forest, dimensionality reduction algorithms, or gradient boosting algorithms.

11. A non-transitory computer readable medium for performing data analytics using machine learning, comprising code for:
training a plurality of machine learning algorithms using a training dataset;
extracting data associated with one or more shrink predictions generated by a hybrid machine learning algorithm, wherein a hybrid machine learning model selects and tests a plurality of combinations of learning algorithms from the plurality of machine learning algorithms by feeding outputs of a first machine learning algorithm as inputs to a second machine learning algorithm in a particular order and selecting two or more machine learning algorithms from the plurality of machine learning algorithms and a particular order such that the hybrid machine learning model provides a lower margin of error than the margin of error achieved from any one of the plurality of machine learning algorithms individually;
identifying one or more products that are at an elevated risk for shrink during a forthcoming period of time based in part on the data associated with the one or more shrink predictions provided by the hybrid machine learning algorithm;
generating a shrink control plan that identifies actionable steps to minimize risk for shrinkage for the one or more products identified, wherein the shrink control plan includes actionable steps to implement for securing the one or more products; and
displaying the shrink control plan on a display device.

12. The non-transitory computer readable medium of claim 11, wherein the data associated with one or more shrink predictions generated by the hybrid machine learning algorithm identifies the one or more products and an amount of shrinkage for the one or more products that is expected in the forthcoming period of time.

13. The non-transitory computer readable medium of claim 11, wherein the shrink control plan includes information regarding allocation of resources that a user may implement to minimize risk of shrinkage for the one or more products.

14. The non-transitory computer readable medium of claim 13, wherein the resources are one or more of human resources relocation of items to different zones or areas of a retail store, electronic article surveillance (EAS) that are deployed in order to prevent or minimize the risk of shrinkage for the one or more products.

15. The non-transitory computer readable medium of claim 11, wherein the hybrid machine learning algorithm selects two or more algorithms from a subset of machine learning algorithms, wherein the subset of machine learning algorithms includes at least one or more of linear regression, logistic regression, decision tree, random forest, dimensionality reduction algorithms, or gradient boosting algorithms.

* * * * *